360° PHASE SHIFTER

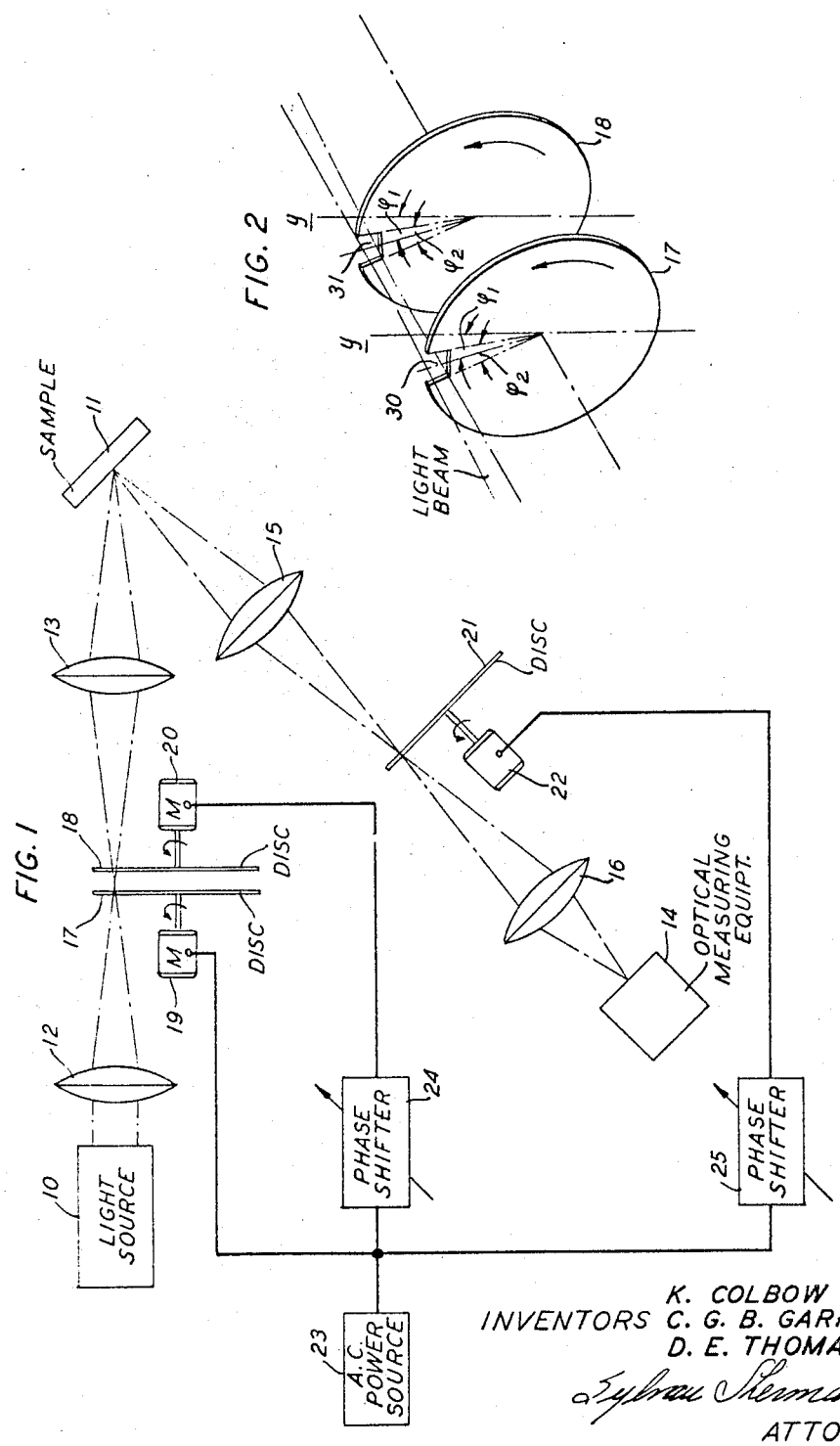

3,435,213
LIGHT MODULATOR USING LIGHT CHOPPERS
Konrad Colbow, Madison, Charles G. B. Garrett, Morristown, and Donald E. Thomas, Madison, N.J., assignors to Bell Telephone Laboratories, Incorporated, New York, N.Y., a corporation of New York
Filed July 19, 1965, Ser. No. 473,042
Int. Cl. G01n 21/38; G02f 1/30; H02p 5/46
U.S. Cl. 250—71                    2 Claims

ABSTRACT OF THE DISCLOSURE

Light pulses of controlled time duration and waveshape are obtained by directing the light beam through two light choppers, synchronously driven from a common alternating current source. The relative position of the two chopper discs is controlled by means of a precision phase shifter connected to one of the chopper motors.

A third phase controlled choper is used to study light emission from test samples at controlled times after photoexcitation.

---

This invention relates to light modulators employing phase controlled, synchronously driven rotation chopping discs.

Light chopping as an aid to measurements in the optical range from the infrared to the ultraviolet has been in use for many years. However, chopping is usually done by a fixed-frequency, motor-driven chopping disc the frequency of rotation of which is not readily changed. With the invention of the laser and the substantial expansion of research effort at optical frequencies, the need for more flexible light choppers has become readily apparent. In particular, there is need for a simple means for controlling the pulse width and the pulse shape of the chopped light beam. In addition, there is a need for controlling the time at which observations of light phenomena are made.

In accordance with one aspect of the present invention, the light beam is interrupted by two chopping discs rotating at the same angular speed. Being driven by synchronous motors, powered from a common alternating current source, the discs are phase locked such that apertures in one of the chopping discs occupy a fixed angular relationship with respect to the apertures in the second chopping disc. This spatial relationship is changed by changing the relative time phase of the alternating current supply to the two synchronous driving motors.

In a first embodiment of the invention, the two chopping discs have equal apertures. When the phases of the driving currents are such that the apertures are aligned, the time duration of the pulse of light passed by the two discs is a maximum. The width of the light pulse is reduced by means of a phase shifter located between the common source and one of the drive motors. As the relative time phase of the driving currents is changed by means of the phase shifter, the relative angular position of the two apertures is correspondingly shifted, thereby decreasing the time during which the light beam can pass through the two rotating discs.

By using appropriate aperture and disc designs, and by controlling the relative time phase of the current supplied to the driving motors, the amplitude and/or shape of the light pulses passed by the disc can be controlled.

To observe light emitted from a light source at controlled times relative to some reference time, a third phase-controlled disc is used. In this manner, for example, the time decay of photoluminescence from a sample material following the termination of photoexcitation can be studied on a point-by-point basis.

In accordance with a second aspect of the invention, two apertured discs are driven synchronously from separate power sources at different speeds. The effect is to produce a train of pulses whose amplitudes and/or widths are modulated at either the difference frequency of the chopping frequencies of the two discs, or at the frequency of one of the chopping discs, depending upon the arrangement of the apertures and discs.

These and other objects and advantages, the nature of the present invention, and its various features, will appear more fully upon consideration of the various illustrative embodiments now to be described in detail in connection with the accompanying drawings, in which:

FIG. 1 shows, in block diagram, an optical system designed for studying photoexcitation effects and utilizing phase-controlled, synchronously-driven choppers in accordance with the invention;

FIG. 2 shows the aperture arrangement on the discs used in the embodiment of FIG. 1;

Figure 3:
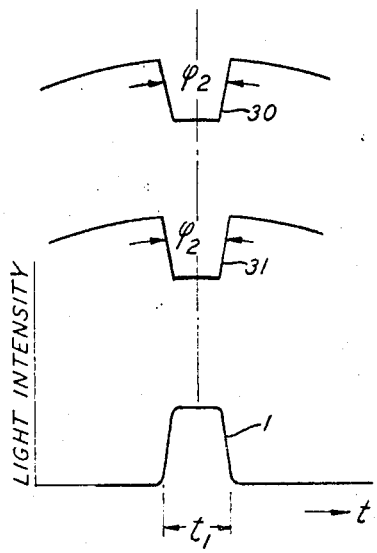
FIGS. 3, 4 and 5 are graphical representations of the relative spatial phase of the discs under various operating conditions, and the resulting light pulses produced thereby.

Referring to the drawings, FIG. 1 shows, in block diagram, an optical system utilizing phase-controlled, synchronously-driven choppers in accordance with one aspect of the present invention. The optical system comprises an optical wave source 10 which, typically, is an optical maser, although it is to be understood that the invention is not limited to any particular type of light source.

The wave energy emitted by source 10 is focused onto a sample of material 11 by means of lenses 12 and 13. Light reflected by, or otherwise emitted, by sample 11 as a result of photoexcitation by light source 10 is focused onto light measuring equipment 14 by means of a second system of lenses which includes lenses 15 and 16.

Disposed about the focal point between lenses 12 and 13 are a pair of chopping discs 17 and 18 which are rotated by driving motors 19 and 20, respectively. A third chopping disc 21, rotated by driving motor 22, is disposed at the focal point between lenses 15 and 16.

Advantageously, all of the motors are of the same kind. In particular, all are synchronous motors whose rotational speed is a function of the frequency of the alternating current supplied to the motors. In this connection, power to drive the motors is derived from a common power source 23. In the embodiment of FIG. 1, motor 19 is directly connected to power source 23, while motors 20 and 22 are connected to power source 23 through adjustable phase shifters 24 and 25, respectively.

FIG. 2 shows the discs 17 and 18 in perspective at a given instant in time. For purposes of illustration the two discs are identical, each having a $\varphi_2$ degree slot 30 and 31 in its periphery, cut to a sufficient depth to permit passage of the light beam. The remainder of the periphery of each of the two discs is intact so as to intercept the beam.

With the motors running at the same speed and phase-locked, the slots remain aligned with respect to each other at all times. Thus, in FIG. 2, the angle $\varphi_1$, from the center of slot 30 to the vertical axis $y$, is at all times equal to angle $\varphi_1'$, from the center of slot 31 to the vertical axis $y$. As long as this condition persists, the pulse of light passed by the choppers has a maximum duration or width.

Figure 4:
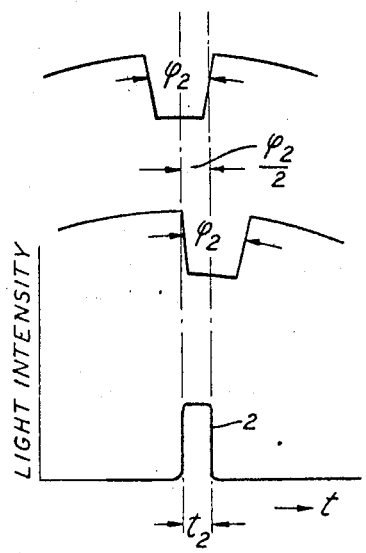
Figure 5:
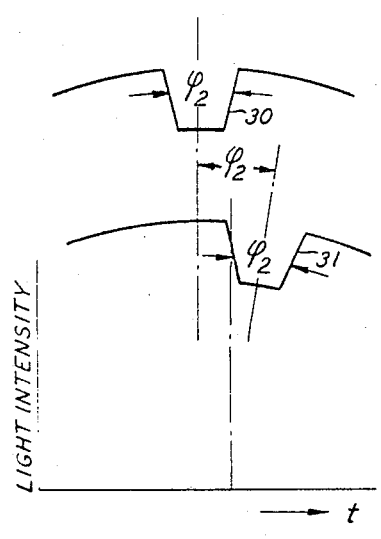

FIGS. 3–5 are graphical representations of the relative spatial phase of the two slots 30 and 31 under various operating conditions. Also shown are the light pulses passed by the discs under the indicated conditions. In particular, in FIG. 3, the two slots are aligned, or in spatial phase, and the resulting light pulse 1 has maximum pulse width $t_1$. In FIG. 4, the reltaive spatial phase of the two slots has been shifted by an amount $\varphi_2/2$, or half the slot widths. Under this condition the light beam is only passed during a time interval equivalent to $\varphi_2/2$. Thus, the width of the resulting light pulse is reduced by half to $t_2 = \frac{1}{2} t_1$.

In FIG. 5, the relative spatial phase of the two slots has been shifted by an amout $\varphi_2$ equal to the full slot width. In this case, the slots share no common interval, and the light is completely blocked. Thus the pulse width is reduced to zero as no light can pass through the chopping discs.

In accordance with one aspect of the invention, the relative spatial phase of the slots in the two chopping discs is changed by varying the relative time phase of the alternating current supplied to their driving motors. As is known, in a synchronous motor the magnetic flux associated with the physically rotating element of the motor is "phase-locked" to the rotating magnetic field associated with the physically stationary element of the motor. As such, a synchronous motor rotates at a speed determined by the frequency of the applied current divided by the number of pairs of poles. In addition, if the time phase of the applied current is changed, there is a corresponding change in the spatial phase of the rotating member sufficient to maintain the characteristic phase-locked condition. For example, if the current phase changes by an amount $\alpha$, the space phase of the motor changes by an amount $\alpha/n$, where $n$ is the number of pairs of poles in the motor. Thus, in the embodiment of FIG. 1, the relative phases of slots 30 and 31 can be altered by varying the amount of phase shift introduced into the current supplied to motor 20 by phase shifter 24. In this manner, the pulse width of the optical beam directed upon sample 11 can be varied from a maximum, when the slots are aligned, to zero where their relative positions have been shifted by an amount equal to or more than their angular widths.

Figure 6:
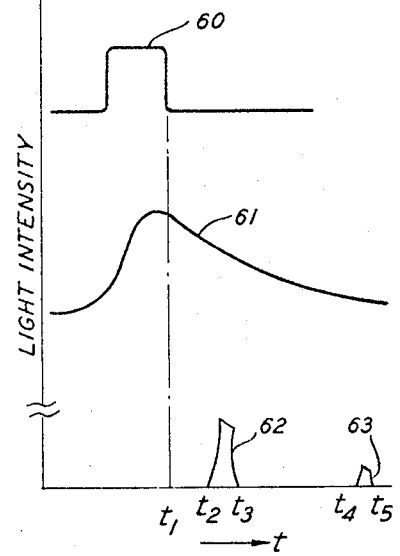
FIG. 6 shows the excitation pulse and the resulting photoluminescence produced in a sample of material and the portions of the photoluminescence passed by a chopping disc for different phase conditions.

In FIG. 1, the light passed by the chopping discs is shown falling upon a sample 11. Typically, sample 11 is some material whose optical properties are being investigated. In connection with this investigation, it is often desired to study the decay of photoluminescence as a function of wavelength, with time after photoexcitation as a parameter. In accordance with the present invention, this is done by observing the light emitted by sample 11 at specified times after photoexcitation has ceased. This is accomplished by varying the spatial phase of the aperture in disc 21, through which the emitted light is made to pass, by means of phase shifter 25. This process is illustrated in FIG. 6 which shows the exciting light pulse 60, incident upon sample 11, terminating at a time $t_1$. The luminescence induced in sample 11 by light pulse 60 is represented by the decaying curve 61. By varying the spatial phase of the aperture in disc 21, the time at which the aperture traverses the emitted light path is correspondingly varied. Thus, in FIG. 6, for one phase condition, the aperture in disc 21 passed light during time interval $t_2$ to $t_3$, as depicted by curve 62. For a second phase condition, the aperture in disc 21 passed light during a later time interval $t_4$ to $t_5$, as depicted by curve 63. As is apparent, the variation with time in the amount of light emitted by sample 11 can be carefully studied by the simple expendient of varying the phase of the current supplied to driving motor 22 by means of phase shifter 25.

Phase shifters 24 and 25 can be any type of suitable phase shifter known in the art. In a particular illustrative embodiment of a light modulator constructed in accordance with the teachings of the present invention, a phase shifter of the kind shown on page 137, FIG. 4.34(d), of M.I.T. Radiation Laboratory Series, volume 19, was used. In order to achieve an approximately linear relationship between phase shift and the angular position of the adjustale resistance that was used to control the phase, the total phase shift was divided between two cascaded units, as illustrated in FIG. 7.

The phase shift in each unit is controlled by one of two 1K$\Omega$, ten turn potentiometers mounted on, and driven by a common shaft. Each unit is limited to a total phase shift of only slightly more than 90 degrees, for a total of something over 180 degrees. The remaining 180 degrees needed to make a total of 360 degrees is obtained by a reversing switch 70, at the input winding of the input transformer 71.

A constant voltage, push-pull source for the first basic phase shift circuit is obtained from the two ten ohm resistors connected to the secondary winding of transformer 71. A pair of emitter followers $Q_2$ and $Q_3$ provide the constant voltage drive for the second phase shifter unit. The high impedance, base input circuits of the common emitter transistors $Q_1$ and $Q_4$ provide the high impedance take-off for the basic phase shifter circuits.

Figure 7:
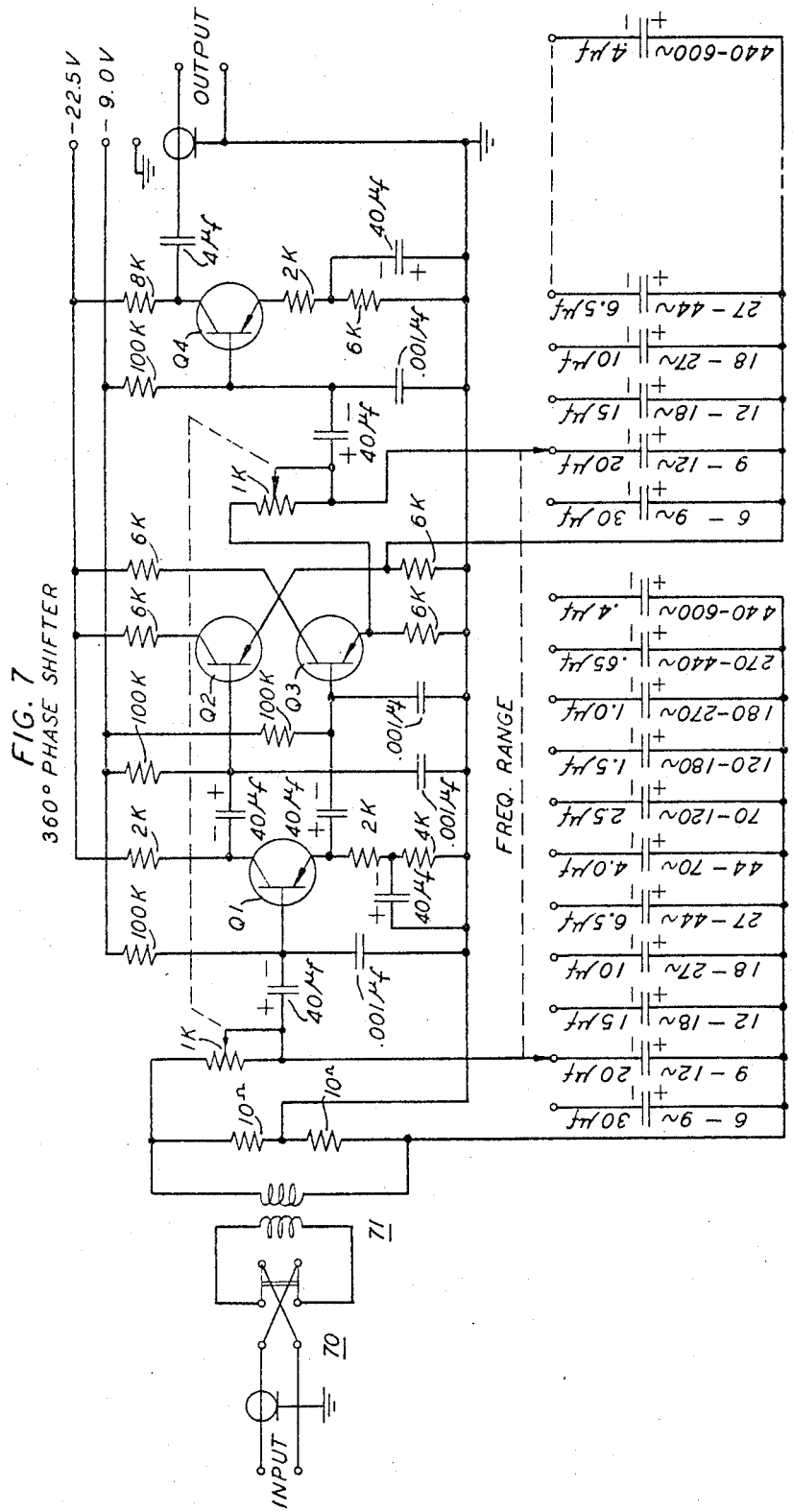
FIG. 7 is a circuit diagram of a phase shifter suitable for use in the invention.

In the particular circuit in which the phase shifter illustrated in FIG. 7 was used, the common alternating current power source was a low power, variable frequency oscillator. The bank of capacitors in FIG. 7, designated "frequency range," was used to match the phase shifter to any frequency between six cycles per second to 600 cycles per second, in eleven discrete steps.

Since phase shifting was done at low power levels, a power amplifier (not shown in FIG. 1) was also included in each of the motor circuits.

Figure 8:
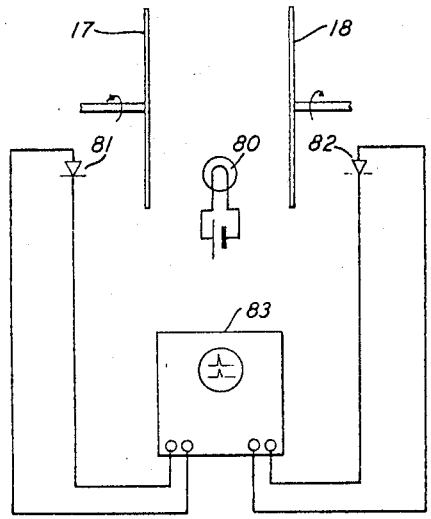
FIG. 8 shows an arrangement for aligning the initial position of the chopping discs.

Initial position calibration of the discs is accomplished, as illustrated in FIG. 8, using a reference signal lamp 80 and a pair of photodiodes 81 and 82. Reference lamp 80 is mounted between discs 17 and 18, while the photodiodes 81 and 82 are mounted on opposite sides of discs 17 and 18, respectively. The output from each diode is connected to separate amplifiers of a dual beam oscilloscope 83. The signal from each photodiode appears as an indication on oscilloscope 83. By adjusting the relative phase shift of the current supplied to driving motors 20 relative to that supplied to driving motor 19, the signal produced by photodiode 82 can be made to occur at any controllable and measurable time after the signal produced by photodiode 81. Knowing the angular speed of the discs, it is then possible to compute the spatial phase relationship between the apertures in the two discs.

A similar arrangement is used to determine the time delay between the termination of the photoexcitation pulse directed upon sample 11 and the time of observation of photoemission from the sample.

Figure 9:
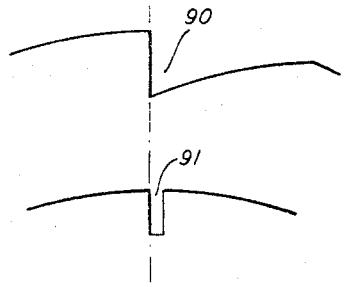
FIGS. 9 and 10 show various other arrangements of chopping discs for producing different pulse outputs.

For purposes of the explanation given in connection with FIG. 2, it was assumed that the apertures in the two discs were the same. It is apparent, however, that this need not be so, and that by using different combinations of disc apertures different results can be achieved. For example, if one of the apertures has a tapering depth, as illustrated by aperture 90 in FIG. 9, and the other aperture 91 is a rectangular slot that is narrow compared to aperture 90, pulses of uniform width, but of variable amplitude, can be obtained by changing the relative angular phase of the two discs.

Figure 10:
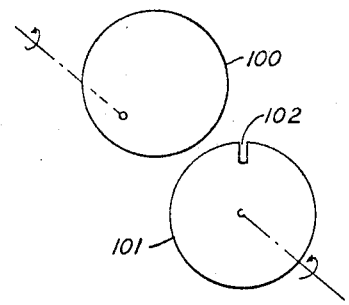

Another possible arrangement, illustrated in FIG. 10, is to mount one disc 100 eccentrically, thus permitting it to pass varying amounts of light as it rotates. The second disc 101 is symmetrically mounted and includes a rectangular slot 102. This combination likewise produces light pulses of uniform pulse width and varying amplitude.

In the discussion so far, light choppers rotating at the same speed have been described. In accordance with a second aspect of the invention, light choppers rotating at different speeds will now be considered.

Figure 11:
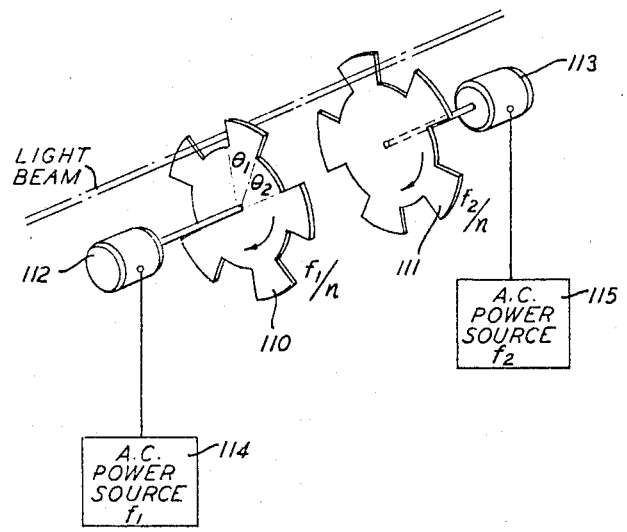
FIGS. 11 and 12 show arrangements of chopping discs operating at different synchronous speeds.

The light chopper shown in FIG. 11 comprises two identical chopping discs 110 and 111 driven by similar synchronous motors 112 and 113, respectively. In this embodiment, however, the motors are energized from separate alternating current sources. In particular, motor 112 is powered by a source 114 at a frequency $f_1$, whereas motor 113 is powered by a source 115 at a different frequency $f_2$. If the motors are similar (have the same number of poles) the discs will rotate at speeds equal to $f_1/n$ and $f_2/n$, where $n$ is equal to the number of pairs of poles in each motor.

The type of modulation produced by this arrangement will, of course, depend upon the aperture arrangements on the two discs. For example, if both discs include a plurality of equal slots and teeth, uniformly spaced around the periphery of the discs, as illustrated in FIG. 11, the effect is to modulate the light pulse width at a rate equal to the difference frequency $(f_2/n - f_1/n)$, from a maximum pulse width when the slots on the two discs are aligned, to zero pulse width when the slots on one disc are aligned with the teeth of the other disc.

Figure 12:
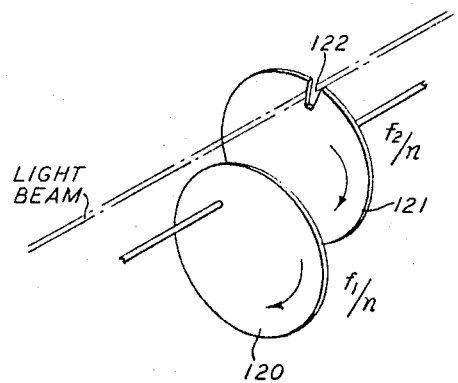

FIG. 12 shows a second arrangement and is similar to the arrangement shown in FIG. 10 except that in FIG. 11 the discs rotate at different speeds. In the arrangement of FIG. 12, disc 120 is a full disc, eccentrically mounted. As it rotates, the intensity of the light it passes varies sinusoidally. Disc 121, which is symmetrically mounted, includes a single slot 122 which passes pulses of light at different intervals of this sinusoidal variation. The output, therefore, comprises pulses of constant width whose amplitudes vary sinusoidally at the frequency $f_1/n$ of the sine wave chopping disc 120.

The number of variations that can be devised is obviously great. Those that have been described are merely illustrative of but a small number of the many possible specific embodiments which can represent applications of the principles of the invention. Numerous and varied other arrangements can readily be devised in accordance with these principles by those skilled in the art without departing from the spirit and scope of the invention.

What is claimed is:
1. An optical system including:
   a light source;
   and optical measuring equipment;
   means for directing the light emitted by said source onto a sample of material;
   said means including a pair of rotating chopping discs for modulating said light;
   each of said discs being rotated by a separate phase-controlled synchronous motor;
   and second means for directing onto said measuring equipment at least a portion of light emitted by said material due to photoexcitation by said incident light;
   said second means including a third phase-controlled, synchronous-driven, chopping disc.
2. The system according to claim 1 wherein said pair of chopping discs produce light pulses of variable pulse width;
   and wherein the spatial phase of said third chopping disc is adjusted to pass light emitted by said material at controlled time intervals following the termination of photoexcitation induced by the pulses produced by said pair of chopping discs.

References Cited
UNITED STATES PATENTS

| | | | |
|---|---|---|---|
| 3,024,699 | 3/1962 | Chitayet | 250—233 |
| 3,131,308 | 4/1964 | Fredrickson et al. | 250—233 |
| 3,213,377 | 10/1965 | Neale | 318—85 |
| 3,334,235 | 8/1967 | Zarowin | 250—71 |

RALPH G. NILSON, *Primary Examiner.*

MORTON J. FROME, *Assistant Examiner.*

U.S. Cl. X.R.

250—233; 88—14; 350—266, 272, 273, 274; 318—85